No. 690,067. Patented Dec. 31, 1901.
A. F. MAULHARDT.
COMBINATION SUBSOIL, GANG, AND SULKY PLOW.
(Application filed July 26, 1899.)
(No Model.) 6 Sheets—Sheet 1.

No. 690,067. Patented Dec. 31, 1901.
A. F. MAULHARDT.
COMBINATION SUBSOIL, GANG, AND SULKY PLOW.
(Application filed July 26, 1899.)
(No Model.) 6 Sheets—Sheet 2.

Witnesses
Inventor
Albert F. Maulhardt
by Townsend Bros.
his attys.

No. 690,067. Patented Dec. 31, 1901.
A. F. MAULHARDT.
COMBINATION SUBSOIL, GANG, AND SULKY PLOW.
(Application filed July 26, 1899.)
(No Model.) 6 Sheets—Sheet 4.

Witnesses
Jerry Kingman.
E. A. Waterman.

Inventor
Albert F. Maulhardt
by Townsend Bros.
his Atty.

No. 690,067. Patented Dec. 31, 1901.
A. F. MAULHARDT.
COMBINATION SUBSOIL, GANG, AND SULKY PLOW.
(Application filed July 26, 1899.)
(No Model.) 6 Sheets—Sheet 5.

UNITED STATES PATENT OFFICE.

ALBERT F. MAULHARDT, OF MONTALVO, CALIFORNIA.

COMBINATION SUBSOIL, GANG, AND SULKY PLOW.

SPECIFICATION forming part of Letters Patent No. 690,067, dated December 31, 1901.

Application filed July 26, 1899. Serial No. 725,182. (No model.)

*To all whom it may concern:*

Be it known that I, ALBERT F. MAUL­HARDT, residing at Montalvo, in the county of Ventura and State of California, have in­ vented a new and useful Combination Sub­soil, Gang, and Sulky Plow, of which the fol­lowing is a specification.

The features of this invention are—

First, the adjustment of a frame which car­ ries chisels or cutters worked as subsoilers following the furrow-wheel and raised and lowered with the frame of the plow or in­dependently by a lever operating the same, with which lever it may be raised consider­ ably above the unplowed land. The machine is so arranged that one, two, three, or more chisels may be used or a share in their place. The advantage of using several chisels over other subsoil devices is that each one tears and loosens only a small portion of the fur­row and the set the entire width of the fur­row, thus completely pulverizing and mixing together the bottom of the furrow after the front furrow-wheel and horses have passed over it and before and to the right of the share (which is the rear share of the machine when transformed into a gang-plow) to be covered by the land turned by said share, leaving a smooth furrow-bottom made by hind share for horses and front furrow-wheel to go in. The chisels do not break up the subsoil in large clods by lifting it up and al­lowing it to drop back in the old place un­pulverized and unmixed, as shares do in sub­ soiling where the subsoil is hard.

Second, the novel arrangements for attach­ing the cutter or chisel frame to the plow and readily and quickly detaching the same.

Third, the novel way in which the wheels are adjusted to the frame and frame arranged, making it one of the best machines to stay in the furrow, regardless of the uneven amount of draft given it on one side by raising or low­ering the subsoiler or by the subsoiler run­ ning in harder or softer ground, and which uneven side draft would otherwise cause the plow to run to or from the land to great dis­advantage.

Fourth, the novel way of having a narrow frame to permit the inclined right-hand front furrow-wheel to be adjusted within twelve, fourteen, or sixteen inches of the outside left beam (according to the size of the plowshare) for use as a sulky-plow or subsoil-plow and to permit the inclined right-hand front fur­ row-wheel to be extended from the frame eighteen inches, more or less, nor over twenty-four, twenty-eight, or thirty-two inches from the outside left-hand beam, (according to the size of the plowshare,) as desired, to permit the second share (front share of the gang-plow) to be detached and to take land as desired when changed to a gang-plow, and the de­taching of the front share and adjusting front wheel eighteen inches (more or less) closer to the left-hand beam when changing from gang to sulky plow, and vice versa. In this con­nection my invention includes the provision of a supplemental front plow-beam for the gang-plow to carry the front plow and also a rolling colter and a jointer to run in front of said plowshare, said colter and jointer be­ing fastened to the supplemental plow-beam to remain thereon when such plow-beam is detached from the main frame, so that in transforming the plow from a sulky-plow or subsoil-plow to a gang-plow the front share, colter, and jointer are all applied at one op­eration by attaching the front plow-beam to the main frame, and, vice versa, by detach­ ing the front plow-beam these elements are removed from the machine at once without deranging them with relation to the front share. I also make the jointer adjustable to different heights.

Fifth, the novel way of steering said right-hand front furrow-wheel with a lever fastened to the upright shaft of said furrow-wheel and connected with the draft-chain, which may be accomplished by various devices—such, for instance, as a small T-arm and two chains connected thereto by hooks or other device and the other ends of said chains connected and joined to the draft-chain, or a short rod with a hinge device to allow up-and-down motion, but not side motion, which rod is con­nected at same place to draft-chain and is used in place of T-arm with two small chains—and the novel way in which the axle of the front furrow-wheel is bent to cause it to run more regularly in the furrow, which gives the nec­essary control for steering said wheel and al­lows me to dispense with the use of any stiff pole or tongue.

Sixth, the novel means by which I adjust the machine to throw the land a greater or less distance and to a greater or less height, as may be required by different kinds of work—that is to say, when the subsoiler is in operation or when tall stubble or heavy sod is to be turned under better plowing can be done by throwing the land higher and farther than is necessary in ordinary plowing, and I have provided an adjustable and detachable moldboard, which may be fastened to and detached from the moldboard of either plow and the height and pitch of which can be adjusted at pleasure. In practice either or both plows of the gang may be provided with the moldboard attachment.

Seventh, the combination by which the subsoilers can be operated simultaneously with the main frame and by the same hand-lever and can be made to rise and lower at the same speed or more or less rapidly than the main frame, as may be desired, so that by operating one lever the plow can be raised slightly and the subsoilers raised to a greater extent, and, vice versa, the subsoilers can be inserted more rapidly than the plow.

Eighth, the novel device whereby the axle and hub of the wheel mounted thereon are protected from wear, a thin cast thimble being provided which fits on and is fastened to the crank-axle, and a thimble being also provided for the wheel-bearing, so that when these parts become worn they may be replaced with new at small expense.

The accompanying drawings illustrate my invention.

Fig. 1ª is a fragmental view of a modified form of the guiding device for turning the front furrow-wheel. Fig. 2 is a perspective view of my invention when changed for use as a gang-plow. In this view the beam of the front plow is fastened to the bent bar of the frame, which forms a support for the cutter-frame which carries the chisels, as shown in Fig. 1, when the device is used as a subsoil-plow. In this view the chisels, the chisel-carrying frame, the lever and connecting-rods for operating the same, and the rack for holding the lever are omitted, and brackets or blocks are supplied for holding the supplemental plow-beam away from the bent bar of the frame to give room for the attachment of the rolling colter and jointer which are fastened to the front plow-beam to be detached from the bent bar of the main frame at the same time and together with the front plow-beam. A portion of the front furrow-wheel is broken away. Fig. 3 is a view of the cutter-frame and its rock-bar detached. Fig. 4 is a perspective view showing the front of the machine with a different contrivance for turning the front furrow-wheel. Fig. 10ª is a detail of the T-arm. Fig. 11 is a fragmental plan showing the land-wheel, its crank-axle journaled to the frame, and the racks and levers for controlling the said crank-axle. Fig. 12 is a plan detail to illustrate the laterally-adjustable attachments of the rear furrow-wheel. Fig. 12ª shows a preferred arrangement for making such adjustments.

A indicates in a general way a frame formed of two bars $a$ $a'$, fastened together at the rear end and there extending downward to form the beam to carry the rear plowshare B, one of said bars, $a'$, being bent at 1 laterally away from the other bar, $a$, and again bent, as at 2, and thence extending forward parallel with the other bar, as at 3, to form therewith the sides of the plow-frame, connected at the front end by a draft-bar C.

D indicates a cross-brace for stiffening the frame between its ends.

Figures 1, 1B:
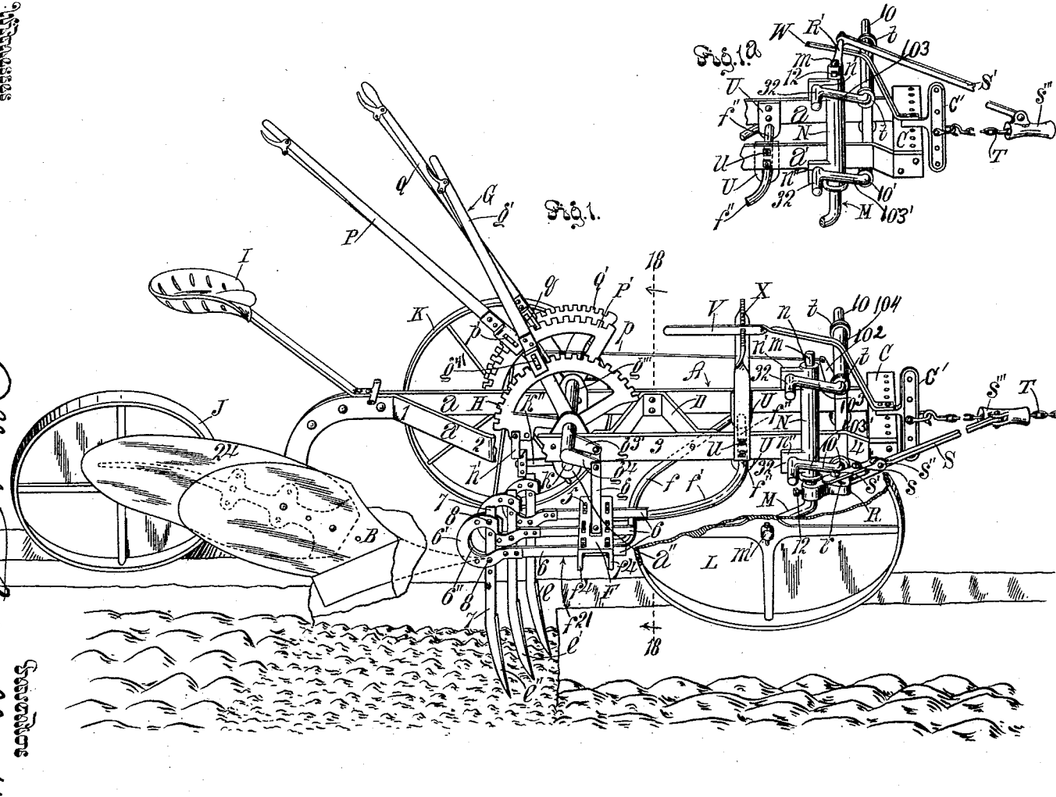
Figure 1 is a perspective view of my invention as it appears ready for use as a subsoil-plow with three chisels or cutters in place. The soil is partly broken away to avoid hiding the cutters or chisels and the rear plow. Fragments of the frame and of the front furrow-wheel are also broken away for clearness of illustration.

The front end of the bar $a'$ is bent away from bar $a$ and then forward, as at 4, to allow greater length for the draft-bar C and to allow the shares of the gang to be held at the right distance apart. A share or other form of cutter is fastened to the laterally-bent bar in front of the bend 2 thereof. In Fig. 1 the cutters which are fastened to this bar are a series of chisels $e\ e'\ e''$, which are adjustably connected with and carried by a frame F, which has forward extensions $f\ f'$, pivoted or hinged, as at $f''$, to the forward part of the frame.

G indicates a lever connected by connecting-rods $g$ with the frame F to raise and lower the same. This lever is carried by and adjustably connected with the frame A and is made in two parts, the handle $g'$ and the crank-shaft $g'''$, having two cranks $g^{3'}\ g^4$ to raise and lower both sides of chisel-frame equally. The crank-shaft $g'''$, which constitutes the pivot of said lever, is journaled to the bars $a\ a'$ of the frame, and the handle $g'$, which constitutes the long arm of said lever, is provided at one end with an eye $g''$, through which the crank-shaft $g'''$ is inserted and fastened by a set-screw $g^{2'}$. The cranks $g^{3'}\ g^4$ constitute the short arm of said lever G.

Figure 18:
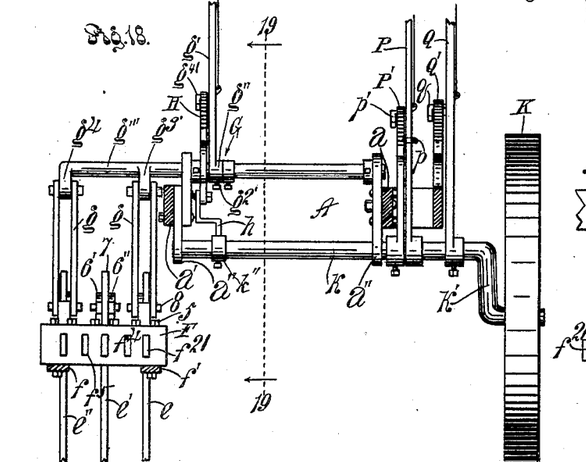
Fig. 18 is a sectional elevation on line substantially indicated by line 18 18, Fig. 1, looking rearward in the direction of the arrows.
Figure 19:
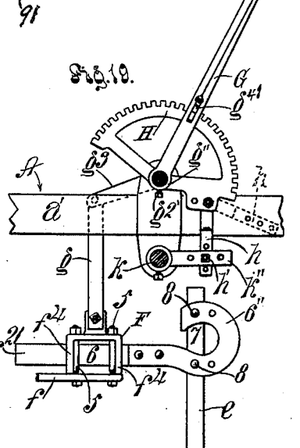
Fig. 19 is a sectional elevation on line 19 19, Fig. 18, looking to the left in the direction of the arrows.

H indicates a detachable segment-rack, which may be fastened to the frame-bar $a'$ for holding the ratchet-catch $g^{41}$ of the lever G. In Fig. 19 a connecting-rod $h$ is shown in dotted lines connecting the segment with the frame-bar $a'$. Solid lines in Figs. 18 and 19 show the connecting-rod detachably connected with a crank-arm $k''$ of the crank-axle $k$, which is carried by the ground-wheel K.

$h'$ indicates a bolt for detachably attaching the segment-rack to crank-arm $k'$ or to the bar $a'$ of the main frame.

The cutter-frame proper is a channel-bar, as at F, with holes $f^5$ through the side members $f^4$ thereof to receive the cutter-supports $f^2$, which are clamped thereto by U-bolts 5, so that the cutters or chisels $e\ e'\ e''$ are adjustably attached to the cutter-carrying frame F. The supports for the cutters $e\ e'\ e''$ each consist of a shank 6 to be clamped to the cross-bar of the frame F by the U-bolts 5 and are provided at the rear end with two fingers $6'\ 6''$, which extend parallel with each other, with a space between, into which the shank 7 of the cutter fits, said fingers being bent to form two bearings to receive bolts 8 for fastening the cutter-shank in place. In rocky soil a wooden peg is used instead of one of the bolts 8, so when a chisel strikes too stubborn an obstacle the peg breaks and allows the arm to fly back and out, thus taking the strain off of the machine and avoiding breakages. A number of extra bolt-holes are provided in the fingers, so that the shanks can be fastened in different positions to give more or less slant and suction to the cutters.

By making the cutters adjustable with relation to the cutter-frame and the cutter-frame adjustable with relation to the main frame and the main frame adjustable with relation to the support therefor the machine is adapted for perfect operation with a large range of adjustment, and by providing for the raising and lowering of both frames and their attachments simultaneously the facility of handling the machine is made very superior.

Figures 2, 3, 4:
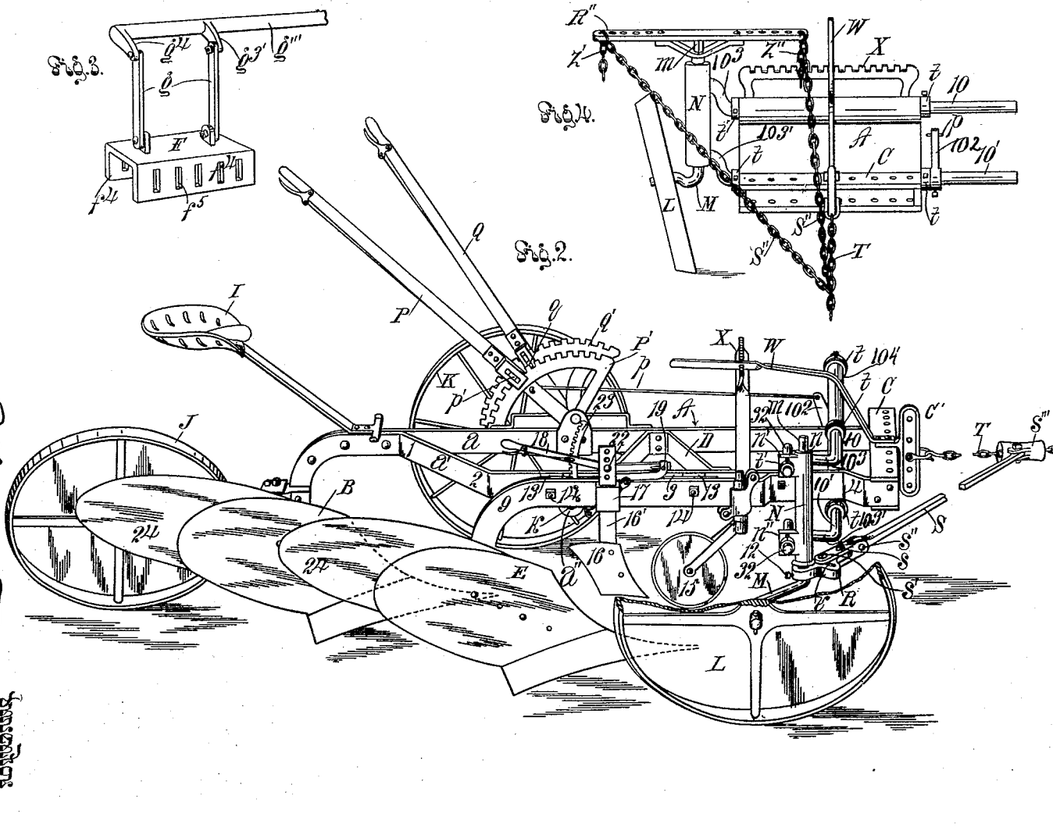

In Fig. 2, E indicates the front share, which takes the place of the cutters $e\ e'\ e''$ when the machine is to be used as a gang-plow. The beam 9 of this share is formed of two bars of iron or steel, except at the front end of said beam, and is bolted to the member $a'$ of the frame A. The cutter-frame F, the lever G, including the crank-shaft $g'''$, and the segment H, are removed for the purpose of this transformation of the plow from a subsoiler to a gang-plow. If desired to use the plow simply as a sulky-plow, the share E may be omitted, as well as the removable subsoiling attachment.

I indicates a detachable seat, which may be clamped to or detached from the plow-beam at pleasure.

The plow-frame A is carried by supporting-wheels J, K, and L, the rear one J of which is a semiswiveled furrow-wheel or tiller-wheel, which is adjustable vertically and sidewise of the frame, as is customary, and slants inward, so as to run along the angle of the furrow, being a revolving landside, swinging only toward the left or unplowed land side and stopping firm when in line with the land side.

M indicates the bent axle of the front furrow-wheel, the vertical member $m$ of which is carried by the boxing N, which is journaled to two crank-shafts, as 10 10', which are operated by a lever P and a connecting-rod $p$.

102 indicates the arm or member of the crank-shaft 10' to which the rod $p$ is connected. The cranks of the shafts 10 10' are journaled to and carry the boxing N. 103 103' indicate the intermediate members of such crank. The shafts 10 10' are journaled in boxes 104 105, which are fixed to frame A, one above the other.

Q indicates a lever which is fixed to the main body of the axle $k$, which is journaled to the frame A by journal-bearings $a''$.

Q' indicates a rack fixed to the frame A to hold the ratchet $q$ of the lever Q, so that by moving the lever Q the body of the axle $k$ can be turned, thus to turn the crank with relation to the frame A, and the crank can be held by the ratchet on the rack $q'$.

The lever P is journaled on the axle $k$, and the rack P' is fixed to such axle. The lever P is provided with a pawl $p'$ to catch the rack P' to hold the lever P in any given position with relation to the crank-arm of the axle $k$. To adjust the frame to any slant desired, so as to incline the plow-points, the lever P will be operated to turn the crank-shafts 10 10' at the front of the machine to throw the axle M up or down with relation to the frame, thus lowering or raising the front end of the frame until the frame is brought to the desired slant. Then the pawl $p'$ is allowed to catch the rack P', thus fixing the front axle M in the desired position with relation to the crank-arm $k'$ of the land-wheel axle $k$. Then the lever Q may be operated to simultaneously turn the axles $k$, 10 10' to raise or lower the wheels K and L with relation to the frame A, thus, in effect, raising or lowering the frame A with relation to the ground. When the pawl $p'$ fastens the lever P to the rack P', then by raising or lowering the lever Q the entire frame of the plow and the chisel-frame, with all attachments, are raised and lowered with relation to the ground.

The axle-bar J' of the hind furrow-wheel J is swiveled to the rear plow-beam $a^{2'}$ (see Fig. 9) by a pin $j'$, so as to swing laterally.

Figures 9, 10:
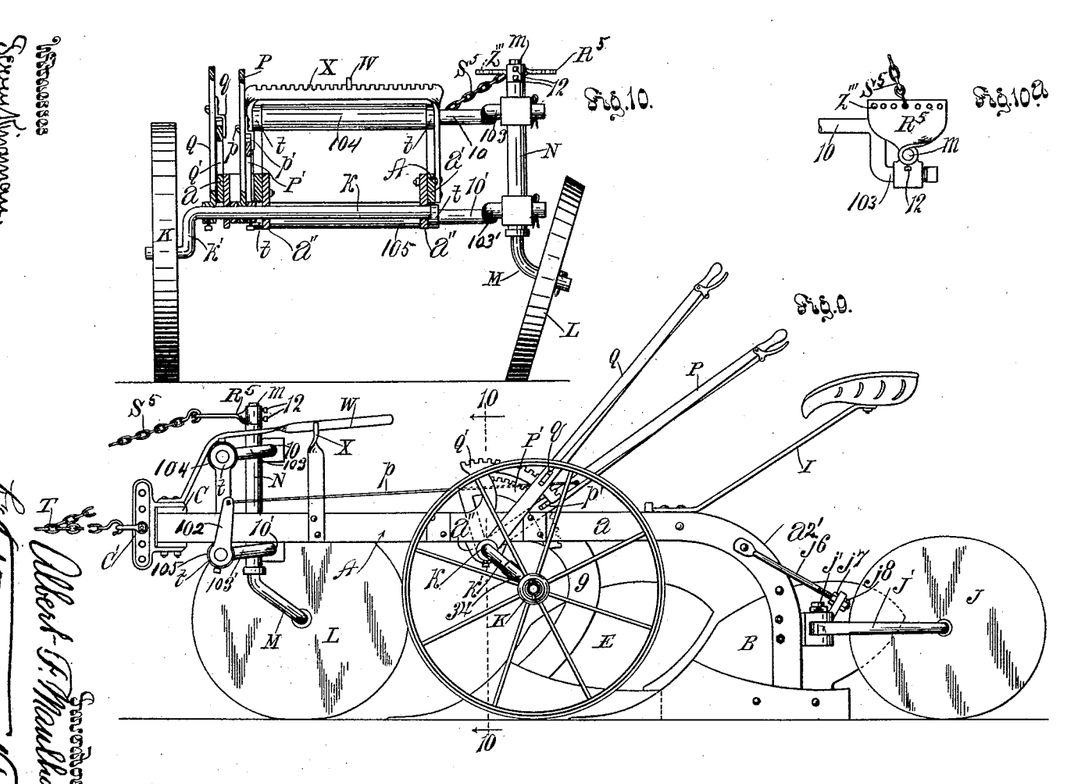
Fig. 9 is an elevation of the machine viewed from the side opposite to that of Figs. 1 and 2. In this view the detachable moldboards are not shown, and a different form of contrivance for turning the front furrow-wheel is shown.
Fig. 10 is a sectional elevation on line 10 10, Fig. 9, the front plow-beam being omitted and fragments of the levers P and Q being shown.
Figures 11, 12, 12A:
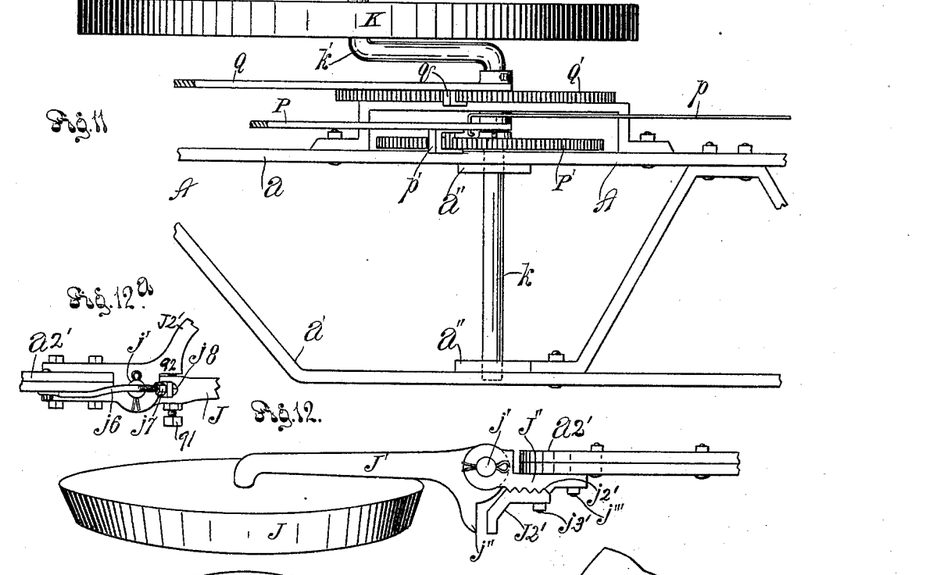
Figure 13:
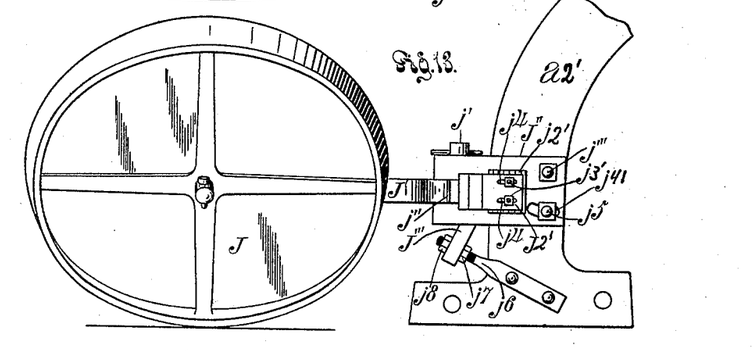
Fig. 13 is a side elevation of Fig. 12, showing a fragment of a plow-beam, the share being detached therefrom. A form of device for raising and lowering the rear furrow-wheel is shown different from that illustrated in Fig. 9.
Figure 14:
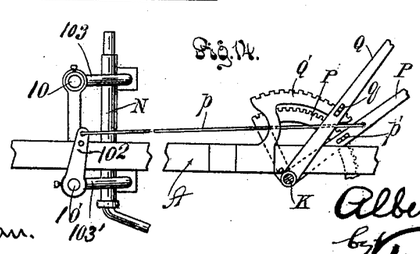
Fig. 14 is a fragmental detail in elevation viewed from the land side of the plow and illustrating the lever connections for operating the front furrow-wheel axle and the land-wheel simultaneously.
Figures 16, 17:
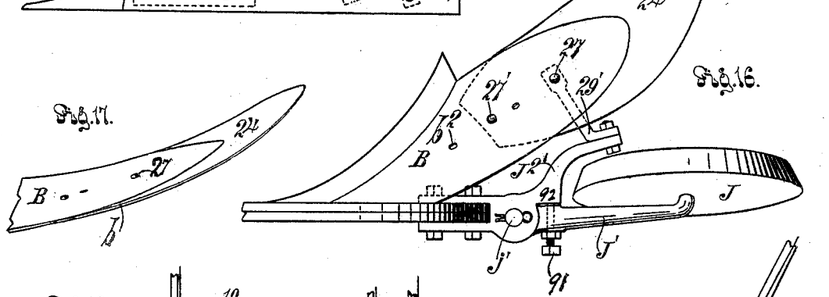
Fig. 16 is a plan of a plow provided with detachable moldboard. In this view a revolving landside is shown.
Fig. 17 is a view looking at the edge of the moldboard with moldboard extension attached.

In Fig. 12, $J^2$ indicates an adjustable block, against which an arm $j''$ of the axle-bar J' engages to keep the wheel J from swinging too far toward the rear share B. The block $J^{2'}$ may be secured and adjusted longitudinally as desired. $j^{2'}$ indicates a ridged face to engage with a corresponding face on the hinge-block J'', to which the rear axle-bar J' is hinged. $j^{3'}$ indicates bolts which fasten the block $J^{2'}$ to the hinge-block J''. The block $J^{2'}$ is provided with slots $j^4$, (see Fig. 13,) through which bolts $j^{3'}$ pass, thus allowing the block $J^{2'}$ to be adjusted. The hinge-block J'' is provided with a bolt $j'''$, which pivots it to the beam $a^{2'}$, and is also provided with a curved slot $j^{41}$, through which a bolt $j^5$ passes, so that by loosening the bolts the hinge-block can be tilted to raise or lower the rear wheel. J''' is an arm projecting downward from the hinge-block J'', and through this arm a bolt $j^6$ is passed, with nuts $j^7$ and $j^8$ on opposite sides of the arm J'''. The bolt $j^6$ is fastened to the beam $a^{2'}$, and by loosening the bolts $j'''$ $j^5$ and adjusting the nuts $j^7 j^8$ the block J'' can be tilted up or down with relation to the foot of the plow, thus raising and lowering the rear furrow-wheel. In Fig. 12$^a$ the adjustment is made by a set-screw 91, which screws through arm J' against a jaw 92, thus to limit the movement to the right. In Fig. 16 the set-screw 93 engages the arm $J^{2'}$. In Fig. 9 the bolt $j^6$ is fastened to the beam $a^2$ above the block J' instead of below, as shown in Fig. 13.

The upright member or stem $m$ of the front furrow-wheel L is provided with one or more arms (indicated in the several views at R R' R'' R''' $R^4 R^5$) which are respectively connected by suitable means (indicated in the several views by S S' S'' S''' $S^4 S^5$) with the draft-chain T, which is fastened to the draft-bar C. In Figs. 1 and 2 the arm R has a segmental slot $r$, and a jointed extension S is adjustably fastened to the arm R by bolts $s s'$. The arms and connections R R' S S' T T', &c., will be made of a suitable length. In some of the views such arms and connections are broken for economy of space, the bolt $s'$ passing through the segmental slot $r$, so that the angle of the extension S with the spindle $m'$ of the furrow-wheel axle can be changed. The joint $s''$ of the extension S allows the outer member of the extension to swing up and down. $s'''$ indicates a sleeve to which the outer member of the extension of rod S is pivoted, and the draft-chain T is passed through the sleeve loosely, so that the sleeve may slip upon the draft-chain. In Fig. 1$^a$ an arm R' is fixed to the top of the stem $m$, and a connecting-rod S' is loosely mounted at one end on the arm R' to swing up and down, and the other end is pivoted to the sleeve $s'''$. In Fig. 4, R'' indicates a T-lever fixed to the top of the upright member $m$ of the furrow-wheel axle and provided with grab-links Z' Z'', into which are caught the links of steering or guide chains S'', the other ends of which are joined and fastened to the draft-chain T, which is fastened to the draft-bar C. The operation with each of the connecting-rods S S' S''' $S^4$ is substantially the same and the effect is the same as with the guy-chains. The rod S in Figs. 1 and 2 will be adjusted toward or from the furrow, as desired, by loosening the bolts $s s'$ and moving the extension in the direction desired and then retightening the bolts. 12 indicates set-screws to provide for adjusting the several arms R R', &c., on their respective stems $m$. It will be observed that when the draft is directly forward the draft is all borne by the draft-bar, and the guy-chains simply serve to prevent the swiveled furrow-wheel from turning out of its path. When the team which is hitched to the draft-chain turns, one of the steering or guy chains becomes slack and the other tight. Thus the furrow-wheel is run in the direction required in turning. If it is desired to drive straight forward, the guy-chain will hold the wheel true with the furrow. The T-lever R'' is fastened to the top of the member $m$ of the furrow-wheel by means of a square hole, and the crank-shafts 10 10', which carry the boxing N, are long enough to be extensible to throw the furrow-wheel L to the right or left, as will be necessary when the machine is changed from subsoil or sulky to a gang plow, and vice versa.

$t$ indicates collars with set-screws to fasten the shafts 10 10' in any desirable place to hold the wheel L where desired.

In Figs. 1 and 1$^a$, U indicates detachable boxes or bearings for the axle $f'''$ of the forward extension $f f'$ of the cutter-frame. $u$ indicates bolts for fastening the same to the frame.

In practical operation with the steering-chains S'', Fig. 4, when the team pulls straight forward to draw the machine along the furrow the draft-chain T will pull upon the steering-chains S'' and hold the T-lever R'' in its square extending position, so that the tiller-wheel or furrow-wheel L will run in the line for which it is set and will not climb out of the furrow, but will compel the machine to follow along the furrow; but when the team turns the draft-chain T is drawn sidewise and one of the steering-chains S'' will slack and the other pull, compelling the swiveled furrow-wheel to take its own course, so that the furrow-wheel L will follow instead of guiding the movement of the frame, thus allowing the machine to readily turn a square left corner, (also as a gang it will turn square around to the right, if so desired.) The steering-rod connected in place of the chains will give the same result in all respects as to steering the wheel. The furrow-wheel L can be set to turn toward either side of the machine by shortening the one chain (S'') and thus lengthening the other chain S''.

W designates a lever that readily admits to give the plow more or less land, as desired, as is generally used on plows, and X is a notched bar for holding said lever W.

In Figs. 10 and 10$^a$, Z''' indicates holes for holding the hook of chain S$^5$ and allowing the same to be adjusted at different points along the T-arm R$^5$.

In Fig. 2, 13 indicates projecting blocks or brackets on the side of the frame opposite to that on which the rear plow B is attached. 14 indicates bolts through the supplemental plow-beam and through the blocks and the bar or member $a'$ of the main frame to detachably attach the supplemental plow-beam 9 to the brackets. The brackets 13 hold the plow-beam sufficiently away from the bar $a'$ to accommodate the fastenings of the rolling-colter 15 and the jointer 16. 16' indicates the shank on the jointer, which is mounted to play in a vertical guide 17 on the supplemental plow-beam. 18 indicates a lever provided with a catch and connected with the beam by a pivot, as at 19, and with the shank, as at 22, to move the shank up and down. 23 indicates a segmental rack on the plow-beam to adjustably hold the lever.

24 indicates the detachable moldboard extension on the moldboard of the plow. The rear of the permanent moldboard is brought to a thin edge, as at $b$ in Fig. 17, and the moldboard extension is fitted to the inside of the moldboard and extends upwardly and rearwardly therefrom. I have provided suitable means for fastening the extension to the moldboard, on the inside or rear thereof. (See Fig. 15.)

25 25' indicate bolt-holes arranged in two vertical lines, and 26 indicates a slot in the front end of the moldboard extension and substantially parallel with said lines 25 25'. 27 27' indicate bolts for said holes and slot to secure the extension to the moldboard. The moldboard extension is thereby adjustably attached to the moldboard. The lines of the bolt-holes 25 25' and the slot 26 are transverse the axis of the extension.

28 indicates a rib extending lengthwise of the moldboard extension and provided with lateral extensions 28' 28''; and said holes and slot pass through said extensions, respectively.

Figure 15:
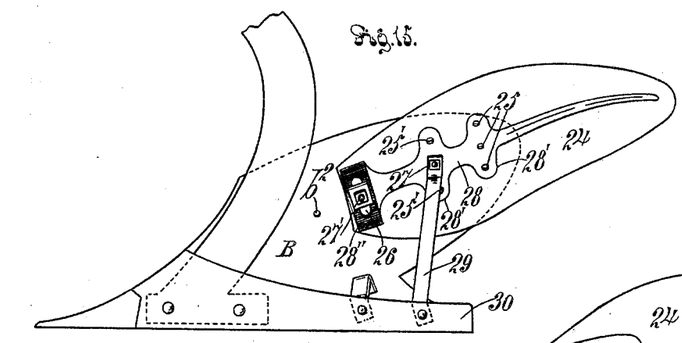
Fig. 15 is a view from the land side of the plow with detachable moldboard extension in a high position. In this view a landside bar-plow is shown.

29 indicates a brace in Fig. 15, extending from the bolt 27 down to the side bar 30. In Fig. 16, 29' indicates a corresponding brace extending from the bolt 27 to the bracket-arm J$^2$, which forms the stop for the swivel-arm J' of the rear rolling landside or furrow wheel J.

Figures 5, 6, 7, 8:
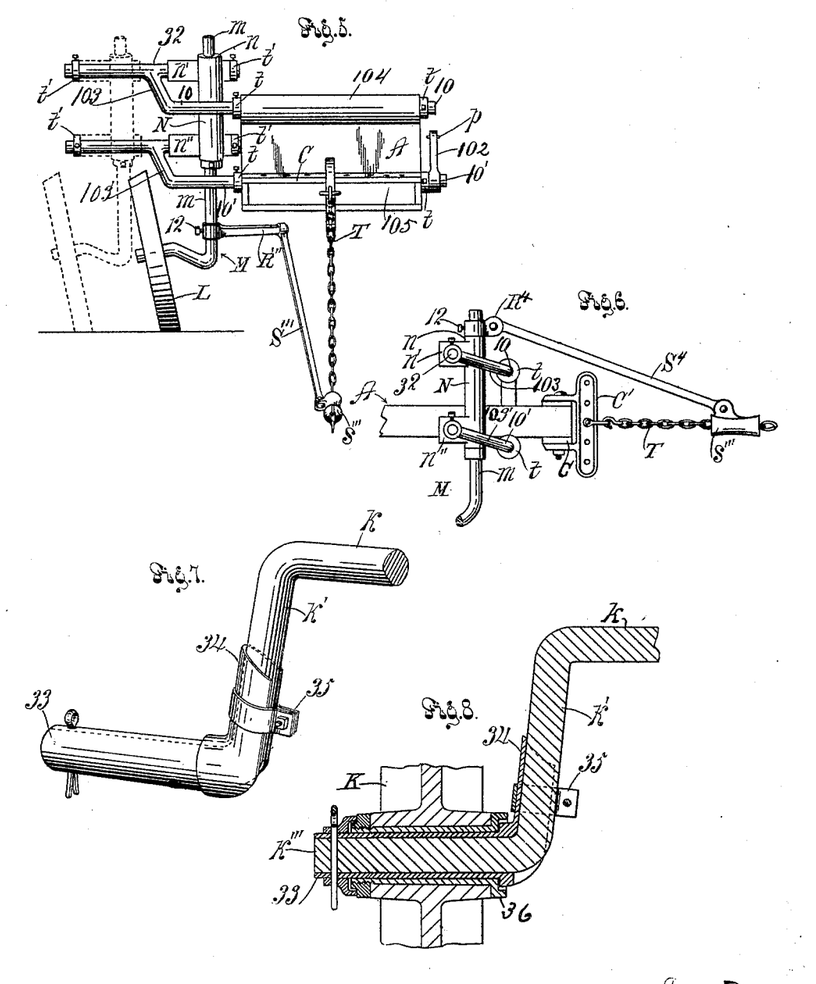
Fig. 5 is a corresponding view showing another modification of the means for turning the front furrow-wheel.
Fig. 6 is a detached fragmental detail illustrating another form of device for turning the front furrow-wheel.
Fig. 7 is a detail showing the application of the detachable thimble to protect the axles.
Fig. 8 is a sectional detail of the same with a fragment of the wheel in place and provided with a detachable thimble-skein.

In Figs. 1, 1$^a$, 2, 5, and 6 the crank-arms 10 10', which carry the front furrow-wheel L, are preferably each provided with a T-shaped head 32 at the end of the crank-arm. The boxing N is provided with a vertical bearing $n$, through which the stem M passes, and also with two horizontal bearings $n'$ $n''$, adapted to interchangeably fit upon the opposite ends of the T portion 32 of the crank. The object of this construction is to enable me to bring the vertical boxing N close to the main frame when so desired, this being accomplished by inserting the inner ends of the T's into the transverse bearings of the boxing, so that the boxing will be between the crank and the frame, as shown in Figs. 5 and 6. Then when it is desired to throw the wheel farther away from the frame this may be done to the greatest extent by mounting the boxing upon the outer arms of the T-head 32, as shown in Figs. 1 and 2 of the drawings and also in dotted lines in Fig. 5.

The segment H is loosely mounted on the shaft $g'''$ and is coupled to the arm $k''$, which arm is immovably fixed to the shaft $k$, so that by raising or lowering the main lever Q the segment H will be moved, and the operator can move the lever G to any desired position and then fasten the lever to the segment by its catch, so that the operation of the lever Q to raise and lower the main frame will act through the arm $k''$, connecting-rod $h$, bolt $h'$, segment H, catch $g^{4'}$, lever $g'$, $g'''$, $g^3$, and $g^4$ to actuate the connecting-rod $g$ to raise or lower the frame F and the chisels connected thereto. To cause the chisels to rise and fall at a greater or less speed, the bolt $h'$ will be changed into the requisite holes therefor in the arm $k'$. By attaching the connecting-rod $h$ directly to the frame, as indicated in dotted lines in Fig. 19, the duplex action just described will be omitted, and the raising and lowering of the main frame will raise and lower the subsoiler at the same speed; but the operator can raise and lower the subsoiler independently of the main frame at any time by releasing the catch $g^{4'}$.

In plowing-machines of this character it is necessary to have crank-axles of great strength, and therefore such axles are required to be made of metal bars bent appropriately; but large expense is incurred from the wear of the spindles of such axles. In Figs. 7 and 8 I have shown the device for preventing the destruction of the axles by wear. 33 indicates a thimble fitted upon the spindle $k'''$ of the axle $k$. 34 indicates an open sleeve fixed to the thimble at an angle thereto corresponding to the angle of the intermediate member $k'$ of the crank-axle. 35 indicates the clamp for clamping the sleeve to the member $k'$. 36 indicates a removable thimble in the wheel K. In practice when the thimbles become worn they are easily replaced at a nominal expense. The thimble is held securely in place by the clamp 35 on the open sleeve 34.

It will be found in operation with the subsoiler that the earth stirred up by the chisels will fill the furrow to such an extent that without the extension of the moldboard the plow B would not throw the land on top of the loosened ground. The necessity of thoroughly covering, turning over, and throwing the earth over the subsoil furrow has led to this improvement. The adjustable feature of the moldboard enables the operator to cause the moldboard to throw the land exactly to the required extent. When the subsoilers are set to work at the greatest depth, the moldboard extension will be adjusted to its highest and most extended position, the bolt 27 being set in the lowest of the holes 25' and the other bolt 27' being set midway of the moldboard and passed through the slot 26; but when the subsoiling is not to be so deep the bolt 27' will be set in the hole $b^2$ of the moldboard and the moldboard will be moved to bring one of the holes 25 into position to receive the bolt 27 and the slot 26 to receive the bolt 27' when said bolt is in hole $b^2$. By placing the moldboard in different positions, so as to bring the bolt 27 into the different holes, respectively, the moldboard can be set at different angles—that is to say, its tilt as well as height can be changed—so as to throw the earth in different ways and to different heights and distances, as required for the work in hand.

To shift the front furrow-wheel in the case of the T-headed crank-shafts 10 10', (shown in Figs. 1, 1ª, 2, and 5,) the bearing N may be taken off of one side of the T and put onto the other side, which will give a lateral adjustment for the stem $m$ of the furrow-wheel of fourteen inches. By having the T-arm a trifle longer than the bearings $n'$ $n''$ the bearing N can be slipped the required distance to properly adjust it and can be secured in place by collar and set-nut, as at $t'$. In Fig. 5 the bearing N is provided with cross-bearings $n'$ $n''$, which project farther on one side of the upright bearing $n$ than on the other, so that by reversing the bearing N to bring the long or short side of the bearings $n'$ $n''$ toward or from the main frame an additional adjustment for the furrow-wheel L is provided for.

In practical operation the draft of the plow in turning is greatly lightened and the operation of turning the course of the plow is greatly facilitated by reason of the connection of the front furrow-wheel with the draft device, whereby the change of direction of the line of draft changes the course of the front furrow-wheel.

By regulating the course of the front and rear wheels by means of the adjustable regulating devices for this purpose the plow can be made to run to cut any desired width of furrow when the team is driven along the furrow, and then when the team is turned out of the furrow the front furrow-wheel automatically turns to guide the plow to follow the team.

By reason of the adjustment of the subsoil-cutters vertically and aslant in their frame and the vertical adjustment of the frame both simultaneously with and independently of the adjustment of the main frame it is made possible to obtain a most satisfactory and economical operation of the subsoiler and plow.

Now, having described my invention, what I claim as new, and desire to secure by Letters Patent, is—

1. A plowing-machine comprising a frame having a land-wheel, front and rear furrow-wheels and a rearward plow, a frame pivoted to the main frame and provided with a plurality of adjustable cutters or chisels; means for raising and lowering the cutter-frame; means for raising and lowering the main frame; means for adjusting the cutters with relation to the cutter-frame, and the combination whereby both frames and their attachments are raised and lowered equally and alike, by one single lever Q.

2. The combination with the main frame, of detachable bearings at the front of said frame; a cutter-frame arranged to run in the furrow behind the front furrow-wheel and forward of the share and connected at the front with an axle carried by said bearings; a lever fastened to the main frame and connected by a connecting-rod with the cutter-frame for lowering and raising the same, completely above the level of the unplowed land while the share is in the ground; and means for holding the lever.

3. In a combination subsoil gang and sulky plow, a frame formed of two bars which at the rear are fastened together and both bent downward to form, together, the rear plow-beam, one of said bars, forward of the downward bend being bent sidewise from the other bar and then again bent and extending forward parallel with the other bar to form the sides of the frame, said bars being fastened together at the front by a draft-bar, said frame being adapted for the attachment of an adjustable cutter-frame and said bent bar being also adapted for the attachment of the front share-beam.

4. The combination with a plow-frame, of an inclined swiveled front furrow-wheel; a T-lever extending from the vertical member of the axle of such wheel; a draft-chain fastened to the plow-frame; and two steering-chains connecting the said T-lever with the said draft-chain.

5. A plow comprising a frame and at the front and rear end of said frame laterally-moving furrow-wheels mounted on axles having vertical members respectively and said wheels being inclined from the vertical; means for raising and lowering one of said wheels; a lever connected with the other of said wheels to adjust the same vertically; and adjustable means for regulating the course of said wheels, respectively, with relation to the line of draft.

6. The combination with a main frame provided with a land-wheel, a furrow-wheel and a plow; of a cutter-frame provided with subsoiling-cutters; and means for adjusting the frames vertically independently of each other, and means for adjusting them simultaneously.

7. The combination, with a frame provided with a plow; of two crank-shafts, one of which is provided with an arm; a vertical bearing carried by said crank-shafts; a crank-axle journaled in said vertical bearing, and provided with a furrow-wheel; and means for moving the arm to adjust the plow.

8. The combination, with a frame provided with a plow; of a land-wheel and an inclined furrow-wheel; means for adjusting the furrow-wheel laterally; and means connecting between said furrow-wheel and the draft device for automatically guiding said furrow-wheel in the direction of the draft in either of its lateral positions, substantially as set forth.

9. The combination with a main frame provided with a plow; of detachable bearings and a rack on the frame; a crank-shaft journaled in the bearings; a lever rigidly secured to the shaft and provided with a pawl for engaging with the rack; a cutter-frame pivotally secured to the main frame; and means for connecting the cutter-frame to the crank-shaft.

10. The combination, with a main frame; of a cutter-frame adjustably suspended therefrom, said cutter-frame comprising a perforated angle-bar; cutter-supports adjustably secured in said perforations, the rear end of each support being provided with two curved parallel fingers at a distance from each other and provided with registering perforations; and pins for holding the cutters between the fingers.

11. The combination, with a frame provided with a plow; of a land-wheel and a furrow-wheel, and a subsoil-cutter frame adjustably supported between the plow and the furrow-wheel; a plurality of cutters adjustably mounted in said cutter-frame; and means for adjusting the cutters aslant in said cutter-frame.

12. The combination with an adjustable wheel-supported frame provided with a plow; of a subsoil-cutter frame in front of the plow; means for adjusting said cutter-frame vertically, independently of the adjustment of the first-mentioned frame; a plurality of subsoil-cutters in said cutter-frame; and means for adjusting said cutters vertically and aslant in said cutter-frame.

13. The combination with the main frame provided with journal-bearings arranged one above the other; of two crank-shafts journaled in said bearings and each provided with a T-shaped head at the end of the crank-arm; and a boxing provided with a vertical bearing and with two horizontal bearings adapted to interchangeably fit upon the opposite ends of the T portion of the crank; and means for operating the crank-shafts.

14. The combination of the main frame; a crank-shaft journaled to the frame; a subsoiler attachment connecting with the crank of the shaft; a hand-lever fixed on the shaft; a segment loosely mounted on the shaft to turn thereon; means for detachably connecting the lever with the segment; a crank-axle journaled to the frame; a ground-wheel of the machine carried by the crank-axle; a projecting arm fixed to the crank-axle; a connecting-rod connecting the segment with the arm of the axle; and means for detachably attaching the hand-lever to the segment.

15. The combination of the frame; the crank-axle provided with a ground-wheel and journaled to the frame and provided with an arm; a crank-shaft journaled to the frame and connected with a subsoiling device to raise and lower the same; a lever fixed on the shaft; an arm connected with the shaft; and an adjustable connection connecting the arms of the two shafts to cause the same to partially rotate simultaneously.

16. The combination of the frame; the crank-axle journaled to the frame and provided with a ground-wheel and with a crank-arm; a crank-shaft journaled to the frame; a subsoiling device connected with the crank-arm of the crank-shaft; a lever fixed on said shaft to operate the same; a segment loosely mounted to turn on said shaft; a connecting-rod pivoted to the segment and adjustably and detachably connected with the crank-arm of the axle substantially as and for the purpose set forth.

ALBERT F. MAULHARDT.

Witnesses:
 H. L. POPLIN,
 C. P. BAGIN,
 JAMES R. TOWNSEND,
 F. M. TOWNSEND.